(12) United States Patent
Cook et al.

(10) Patent No.: US 9,303,152 B2
(45) Date of Patent: Apr. 5, 2016

(54) USE OF MICROWAVE ENERGY TO SELECTIVELY HEAT THERMOPLASTIC POLYMER SYSTEMS

(75) Inventors: Michael Cook, Schoenenberg (CH); Rudolfo Salmang, Terneuzen (NL); Michael S. Paquette, Midland, MI (US); Robert P. Haley, Jr., Midland, MI (US); Sam L. Crabtree, Midland, MI (US); Jose J. Longoria, Lake Jackson, TX (US); Herbert Bongartz, Einsiedeln (CH); Andreas Mayer, Wollerau (DE); Saeed Siavoshani, Rochester Hills, MI (US); Peter K. Mercure, Midland, MI (US); Shih-Yaw Lai, Pearland, TX (US); Jeff Watkins, Midland, MI (US); John L. Sugden, Saginaw, MI (US); Ronald Van Daele, Belsele (BE)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 522 days.

(21) Appl. No.: 12/302,208

(22) PCT Filed: May 31, 2007

(86) PCT No.: PCT/US2007/012817
§ 371 (c)(1),
(2), (4) Date: Mar. 5, 2009

(87) PCT Pub. No.: WO2007/143015
PCT Pub. Date: Dec. 13, 2007

(65) Prior Publication Data
US 2009/0286013 A1   Nov. 19, 2009

Related U.S. Application Data

(60) Provisional application No. 60/809,520, filed on May 31, 2006, provisional application No. 60/809,526, filed on May 31, 2006, provisional application No. 60/809,568, filed on May 31, 2006.

(51) Int. Cl.
*B29C 67/00* (2006.01)
*C08K 9/04* (2006.01)
(Continued)

(52) U.S. Cl.
CPC ............... *C08K 9/04* (2013.01); *C08K 3/0008* (2013.01); *B29C 35/0272* (2013.01); *B29C 2035/0855* (2013.01); *Y10T 428/2993* (2015.01); *Y10T 428/2998* (2015.01)

(58) Field of Classification Search
USPC .......................................... 264/474, 489–490
See application file for complete search history.

(56) References Cited

U.S. PATENT DOCUMENTS 3,801,407 A    4/1974  Goldsworthy et al.
3,862,880 A *  1/1975  Feldman .................... 428/319.9

(Continued)

FOREIGN PATENT DOCUMENTS

CA    2460664 A1    9/2004
DE    10028068 A1   10/2001
(Continued)

OTHER PUBLICATIONS

English abstract of EP378757, 1990.*
(Continued)

*Primary Examiner* — Christina Johnson
*Assistant Examiner* — Xue Liu
(74) *Attorney, Agent, or Firm* — Osha Liang LLP

(57) ABSTRACT

A method for processing a thermoplastic material that comprises a microwave-sensitive polymeric region, wherein the method includes exposing the microwave-sensitive polymeric region to microwaves; wherein the exposing results in an increase in the temperature of the polymeric region; and processing the thermoplastic material is disclosed.

13 Claims, 13 Drawing Sheets

(51) Int. Cl.
*C08K 3/00* (2006.01)
*B29C 35/02* (2006.01)
*B29C 35/08* (2006.01)

(56) References Cited

U.S. PATENT DOCUMENTS

| | | | |
|---|---|---|---|
| 4,859,524 A | 8/1989 | Kim et al. | |
| 5,070,223 A | 12/1991 | Colasante | |
| 5,283,026 A * | 2/1994 | Okumura et al. | 264/234 |
| 5,338,611 A * | 8/1994 | Lause et al. | 428/412 |
| 5,391,430 A * | 2/1995 | Fabish et al. | 428/328 |
| 5,519,196 A | 5/1996 | Xu | |
| 5,916,203 A | 6/1999 | Brandon et al. | |
| 2003/0069326 A1 | 4/2003 | Stangel et al. | |
| 2003/0234459 A1 * | 12/2003 | Nandu et al. | 264/1.36 |
| 2005/0124244 A1 | 6/2005 | Lee | |
| 2009/0286013 A1 | 11/2009 | Cook et al. | |

FOREIGN PATENT DOCUMENTS

| | | | |
|---|---|---|---|
| EP | 378957 A1 * | 7/1990 | |
| JP | 60-064811 A | 4/1985 | |
| JP | 03-182309 A | 8/1991 | |
| JP | 07-178817 A | 7/1995 | |
| JP | 08-072055 A | 3/1996 | |
| JP | 2001-501553 A | 2/2001 | |
| JP | 13-198947 A | 7/2001 | |
| JP | 2005105017 A * | 4/2005 | |
| JP | 2009-512659 A | 3/2009 | |
| KR | 1992-0001445 B1 | 2/1992 | |
| KR | 2000-0015774 A | 3/2000 | |
| KR | 2001-0106116 A | 11/2001 | |
| KR | 10-2005-0104341 A | 11/2005 | |
| WO | 9814314 A1 | 4/1998 | |
| WO | 2004/028463 A2 | 4/2004 | |
| WO | 2004/048463 A1 | 6/2004 | |

OTHER PUBLICATIONS

Enblish abstract of JP07178817.*
English abstract of JP2005105017A, 2005.*
International Search Report issued in PCT/US2007/012817, mailed on Nov. 22, 2007, 2 pages.
International Search Report from PCT/US2007/012822, mailed on Nov. 22, 2007, 2 pages.
Patent Abstracts of Japan, Publication No. 2001-198947 (a/k/a JP13-198947), dated Jul. 24, 2001, 1 page.
Translation of First Office Action issued in corresponding Chinese application No. 200780027771.8 (1 page).
Translation of Final Office Action issued Sep. 27, 2011 in corresponding Japanese application No. 2009-513269 (6 pages).
Translation of Notice of Reasons for Rejection issued in corresponding Japanese application No. 2009-513269 (3 pages).
Translation of Second Office Action issued in corresponding Chinese application No. 200780027771.8 (3 pages).
Translation of Third Office Action issued in corresponding Chinese application No. 2007800276128 (1 page).
Third Non-Final Office Action filed under Japanese Application No. 2009-513269 on Apr. 17, 2012 (4 pages).
Extended European Search Report issued in corresponding European Application No. 07809255.8 dated Oct. 22, 2013 (8 pages).

* cited by examiner

USE OF MICROWAVE ENERGY TO SELECTIVELY HEAT THERMOPLASTIC POLYMER SYSTEMS

CROSS-REFERENCE TO RELATED APPLICATION

This application claims priority to U.S. Provisional Application Ser. Nos. 60/809,520, 60/809,526, and 60/809,568, each filed on May 31, 2006 and each incorporated herein by reference.

BACKGROUND OF DISCLOSURE

1. Field of the Disclosure

The invention relates generally to the use of microwave energy to selectively heat thermoplastic polymer systems. The polymer systems may either be inherently responsive to microwave energy or modified by incorporating appropriate microwave responsive additives in the polymer or as components on the backbone of the polymer.

2. Background

Thermoplastic polymer pellets typically must be melted, re-shaped and cooled in a primary conversion process, such as extrusion or injection molding, in order to make parts of commercial value. In some instances, a secondary fabrication process, such as thermoforming, which involves further heating, reshaping, and cooling is required to achieve parts of commercial value. In both primary and secondary processes, heat energy is applied to the thermoplastic and is subsequently removed after reshaping has occurred.

Conventional heating mechanisms for thermoplastic polymer systems in many instances rely on contact or radiant heat sources. Radiant energy, commonly referred to as infrared, has a wavelength in the range of 1 to 10 microns and will penetrate absorbing materials to a depth of approximately 1 to 2 microns before half of the available energy has been dissipated as heat. The process of heat transfer continues through a process of conduction (in the case of a solid material) or a combination of conduction, convection and mechanical mixing in the case of a molten material. Contact heating similarly relies on conduction (or a combination of conduction, convection, and mixing) from the hot contact surface to heat the "bulk" of the material.

The rate of heat transfer (RHT) associated with a conductive heat transfer process can generally be described by the relationship: RHT=f(A, Ct, Delta T), where A is the area available for heat transfer, Ct is the thermal diffusivity of the material, and Delta T is the available temperature driving force, which will decrease with time as the temperature of the material being heated increases. The thermal diffusivity, Ct, of unmodified thermoplastics is inherently low, thereby impeding the heat transfer in a conventional radiant or contact heating system. Furthermore, the heat conduction process may result in an undesirable temperature gradient with the surface of the part being heated (such as a sheet material) being substantially hotter than the center of the part being heated, and being highly dependent on the thickness distribution of the part being heated.

By way of contrast, microwaves have a wavelength of approximately 12.2 cm, large in comparison to the wavelength of infrared. Microwaves can penetrate to a much greater depth, typically several centimeters, into absorbing materials, as compared to infrared or radiant energy, before the available energy is dissipated as heat. In microwave-absorbing materials, the microwave energy is used to heat the material "volumetrically" as a consequence of the penetration of the microwaves through the material. However, if a material is not a good microwave absorber, it is essentially "transparent" to microwave energy.

Some potential problems associated with microwave heating include uneven heating and thermal runaway. Uneven heating, often due to the uneven distribution of microwave energy through the part, may be overcome to a certain extent, such as in a conventional domestic microwave oven, by utilizing a rotating platform to support the item being heated. Thermal runaway may be attributed to the combination of uneven heating outlined above and the changing dielectric loss factor as a function of temperature.

Microwave energy has been used, for example, to dry planar structures such as wet fabrics. Water is microwave-sensitive and will evaporate if exposed to sufficient microwave energy for a sufficient period of time. However, the fabrics are typically transparent to microwaves, thereby resulting in the microwaves focusing on the water, which is essentially the only microwave-sensitive component in the material. Microwave energy has also been used to heat other materials, such as in the following references.

U.S. Pat. No. 5,519,196 discloses a polymer coating containing iron oxide, calcium carbonate, water, aluminum silicate, ethylene glycol, and mineral spirits, which is used as the inner layer in a food container. The coating layer can be heated by microwave energy, thereby causing the food in the container to brown or sear.

U.S. Pat. No. 5,070,223 discloses microwave-sensitive materials and their use as a heat reservoir in toys. The microwave-sensitive materials disclosed included ferrite and ferrite alloys, carbon, polyesters, aluminum, and metal salts. U.S. Pat. No. 5,338,611 discloses a strip of polymer containing carbon black used to bond thermoplastic substrates.

WO 2004048463A1 discloses polymeric compositions which can be rapidly heated under the influence of electromagnetic radiation, and related applications and processing methods.

A key limitation to the use of microwaves for heating polymeric materials is the low microwave receptivity of many useful polymers. The low microwave receptivity of the polymers thus requires either high powers or long irradiation times for heating such polymeric systems. In polymers designed specifically for microwave absorption, there is often a trade-off between their microwave properties and mechanical or thermal properties, i.e., the mechanical and thermal properties are often less than desirable.

Accordingly, there exists a need for processes and polymeric materials which facilitate the rapid, volumetric heating of the polymer using microwave energy. Additionally, there exists a need for processes and polymeric materials that have the ability to heat or melt only a portion of the polymeric material, sufficient to render the bulk material capable of flow, facilitating the shaping or further processing of the polymer.

SUMMARY

In one aspect, embodiments disclosed herein relate to a method for processing a thermoplastic material that comprises a microwave-sensitive polymeric region, wherein the method includes exposing the microwave-sensitive polymeric region to microwaves; wherein the exposing results in an increase in the temperature of the polymeric region; and processing the thermoplastic material.

Other aspects and advantages will be apparent from the following description and the appended claims.

DETAILED DESCRIPTION

Figure 1:
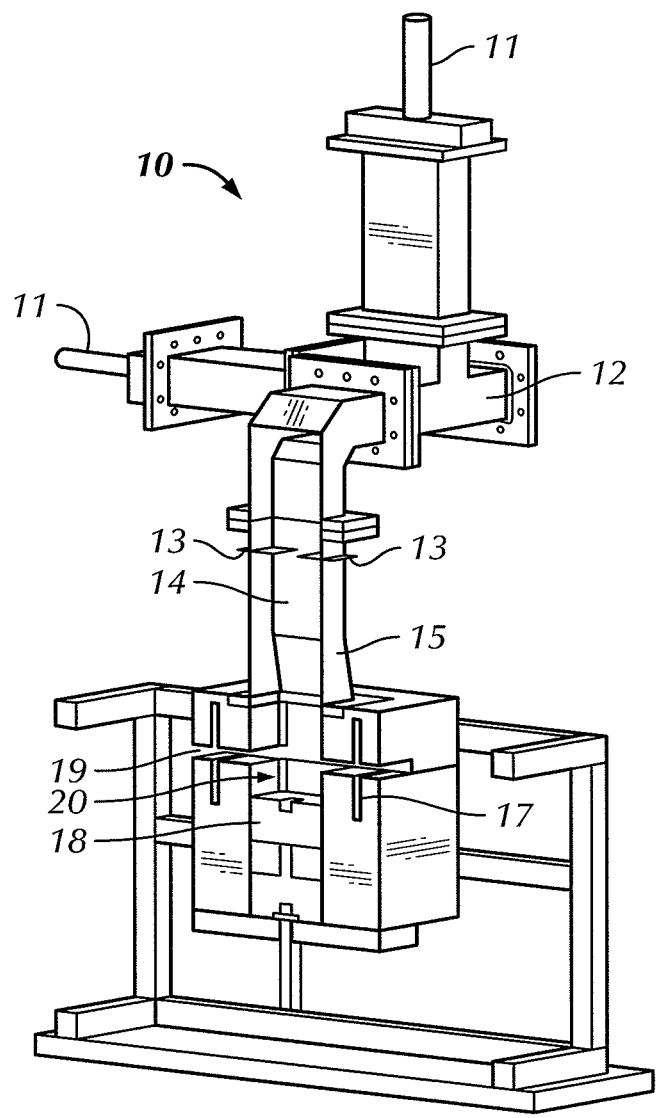
FIG. 1 illustrates a microwave heating device useful in embodiments described herein.

In one aspect, embodiments described herein relate to polymers incorporating microwave-receptive components, either on the backbone of the polymer or as polymeric or non-polymeric additives in the polymer matrix, which may allow the polymer to be heated rapidly and controllably through the application of microwave energy. In other aspects, embodiments described herein relate to methods for processing polymers incorporating microwave-receptive components.

Compared to alternative methods of heating, such as radiant, convective, or contact heating, the use of microwave energy may result in very rapid, volumetric heating. The use of microwave energy may overcome two fundamental limitations of the conventional heating systems: the dependence on the thermal conductivity of the polymer to transport heat energy form the surface of the part; and the maximum allowable temperature of the polymer surface which in turn determines the maximum available temperature driving force.

A polymer may inherently be receptive to microwaves based upon its chemical composition. Alternatively, a microwave-sensitive polymer composition may be formed by combining a microwave-receptive additive with a base polymer which is non-receptive, or "transparent," to microwaves. Suitable base polymers, microwave-receptive polymers, and microwave-receptive additives useful in embodiments of the present invention are described below. The resulting microwave-receptive or microwave-sensitive polymers may be heated using microwave energy, in lieu of or in combination with radiant, convective, or contact heating. The heated polymer may then be mixed, transferred, shaped, stamped, injected, formed, molded, extruded or otherwise further processed, such as in a primary conversion process or a secondary fabrication process to form useful articles.

A number of materials may be heated by the absorption of microwaves. This may be achieved by a dipolar heating mechanism and involves the stimulated movement of permanent dipoles and/or charges, as they attempt to oscillate in sympathy with the oscillating electromagnetic wave moving through the material. The material is thus heated by agitation of molecules and the subsequent viscous transfer of heat to neighboring atoms and molecules. Other materials may heat through Ohmic (resistance) heating as the electric field of the electromagnetic wave stimulates current flow within the material. Yet other microwave heating mechanisms include Maxwell-Wagner and magnetic heating mechanisms. The degree to which any material will heat in the presence of a microwave field is defined by its dielectric loss factor (also referred to as loss tangent or complex dielectric permittivity), which is in effect a measure of the strength of interaction between the material and the electromagnetic wave. Crucially, this heating is a bulk effect, that is, the material effectively heats "volumetrically" and a desired temperature distribution may therefore be achieved in a part through appropriate part design.

For example, in a coextruded sheet designed for thermoforming, a microwave sensitive core layer enables the sheet to be heated from the inside out resulting in a cooler, more desirable sheet surface temperature. In some embodiments, microwave heating may allow the temperature profile of the sheet, including the sheet surface, to be precisely controlled. Control of the sheet temperature profile (through the width, thickness, and/or length) may allow for control of the resulting thickness or polymer distribution of the resulting part. A cooler skin temperature, for example, may alter the resulting material distribution resulting from contact and displacement by a mold.

Microwave-Receptive Additive

The microwave receptor, or the additive which may be blended or reacted with a base thermoplastic polymer to form a microwave-sensitive polymer, may include conductive or magnetic materials such as metals, metal salts, metal oxides, zeolites, carbon, hydrated minerals, hydrated salts of metal compounds, polymeric receptive materials, clays, silicates, ceramics, sulfides, titanates, carbides, sulfur, inorganic solid acids or salts, polymer acids or salts, inorganic or polymeric ion exchangers, clays modified with microwave-receptive compounds, inorganic or polymeric substances which contain a molecular or polymer microwave receptor, organic conductors, or other compounds that may be effective as microwave receptors that may impart receptivity and selective heating to a polymeric material.

Any of the above additives may be used separately or in combination to provide the desired effect of selective heating. In some embodiments, microwave-receptive additives may exhibit a narrow band response to electromagnetic energy. In other embodiments, the microwave-receptive additive may be heated by irradiation across a broad band of frequencies. In one embodiment, the additive may be regarded as having a receptive nature over a frequency range from 1 MHz to 300 GHz or above. In other embodiments, the additive may be heated in a frequency range from 0.1 to 30 GHz or above; from 400 MHz to 3 GHz in other embodiments; and from 1 MHz to 13 GHz or above in other embodiments. In yet other embodiments, the additive may be heated in a frequency range from 1 to 5 GHz.

Some microwave-receptive additives described above may contain tightly bound water, such as zeolites and clays. These materials may also include excess adsorbed water which may be released from the additive upon heating. In some embodiments, microwave-receptive additives may be dried before combination with the polymer. In some embodiments, microwave-receptive additives may be combined with a polymer and the water removed, such as through use of a vented extrusion system. In other embodiments, parts or sheets of polymer containing microwave-receptive additives with bound water may be dried prior to processing of the sheet in a microwave apparatus. In this manner, undesired bubble formation due to excess water may be minimized or avoided.

Polymer

Polymers which may be combined with one or more microwave-receptive additives to form a microwave-sensitive polymer include resins selected from polyolefins, polyamides, polycarbonates, polyesters, polylactic acid and polylactide polymers, polysulfones, polylactones, polyacetals, acrylonitrile-butadiene-styrene resins (ABS), polyphenyleneoxide (PPO), polyphenylene sulfide (PPS), styrene-acrylonitrile resins (SAN), polyimides, styrene maleic anhydride (SMA), aromatic polyketones (PEEK, PEK, and PEKK), ethylene vinyl alcohol copolymer, and copolymers or mixtures thereof. In certain embodiments, polymers which may be combined with a microwave-receptive additive include polyethylene, polypropylene, polystyrene, ethylene copolymers, propylene copolymers, styrene copolymers, and mixtures thereof. In other embodiments, polymers which may be combined with a microwave receptor include acrylonitrile-based polymers, hydroxyl group-containing polymers, acryl- or acrylate-based polymers, maleic anhydride-containing or maleic anhydride-modified polymers, acetate-based polymers, polyether-based polymers, polyketone-based polymers, polyamide-based polymers, and polyurethane-based polymers.

In some embodiments, the microwave-sensitive polymer may be incorporated as a discrete layer (or several layers) in a multi-layered structure in such a way that the discrete layer (or layers) may be preferentially heated prior to subsequent fabrication. Heat energy may then be conducted from these layers to adjacent layers of polymer that may be essentially "transparent" to microwave energy, thereby allowing the total polymer structure to reach the required fabrication temperature more rapidly than with a conventional heating system.

In certain embodiments, the microwave-sensitive polymer may be formed by combining from 0.1 to 200 parts by weight microwave-receptive additive per hundred parts polymer. In other embodiments, the microwave-sensitive polymer may be formed by combining from 1 to 100 parts by weight microwave-receptive additive per hundred parts polymer; from 2 to 50 parts in yet other embodiments; and from 3 to 30 parts in yet other embodiments.

In certain embodiments, the content of the microwave-receptive additive may comprise from 0.1 to 25 weight percent of the microwave-sensitive polymer. In other embodiments, the content of the microwave-receptive additive may comprise from 1 to 20 weight percent of the microwave-sensitive polymer; and from 2 to 15 weight percent in yet other embodiments.

In some embodiments, the microwave-sensitive polymer may be in the form of powder, granules, pellets, uneven chippings, liquid, sheets, or gel. The microwave-sensitive polymer may be crystalline, semi-crystalline, or amorphous. In some embodiments, the microwave-sensitive polymer may include colorants, reinforcing or extending fillers, and other functional additives such as flame retardants or nanocomposites.

Microwave Heating Apparatus

Microwave-sensitive polymeric materials described above may be heated using a microwave heating apparatus for further processing. Referring now to FIG. 1, a microwave heating apparatus 10 that may be used in accordance with embodiments of the processes disclosed herein is illustrated. Components of microwave heating apparatus 10 include tuning pistons 11, EH tuner 12, matching iris plates 13, waveguide 14, horn 15, microwave choke 17 and lower moveable piston 18. Polymer sheets may be processed through the microwave heating apparatus 10 by feeding the samples through the sample feed slot 19, passing the samples through a resonant cavity 20. Operating variables of heating apparatus 20 may be tuned to result in a standing wave in the resonant cavity 20.

In some embodiments, the microwave heating apparatus used in some embodiments may be capable of rapid and uniform heating of polymers, and may adapt to the nature of the microwave-sensitive polymer (receptor type, receptor concentration, matrix type, etc.) and the form of the material being processed (thickness, shape, etc.). As used herein, rapid heating may refer to the heating of at least a portion of the sheet at a rate of at least 5° C. per second in some embodiments; at least 10° C. per second in other embodiments; at least 20° C. per second in other embodiments; at least 30° C. in other embodiments; and at least 50° C. in yet other embodiments. As used herein, uniform heating may refer to the heating of a sheet, or at least a selected portion of a sheet, wherein the heated portion has a maximum temperature variance of 10° C. or less in some embodiments; 7.5° C. or less in other embodiments; 5° C. or less in other embodiments; 4° C. or less in other embodiments; and 3° C. or less in yet other embodiments. By comparison to conventional infrared heating, the heating rates and temperature variances afforded by various embodiments of the microwave heating apparatuses disclosed herein may provide an advantage in cycle times, a reduction in the deleterious effects on the polymer due to excess heat exposure, as well as improved processing.

Apparatus 10 may include a variable power source (not shown); horn 15 may provide a uniform energy density spread; and iris plates 13 and EH tuner 12 may allow for fine tuning of the wavelength emitted. In this manner, the microwave emitter may be tailored to efficiently heat a particular polymer. Analytical measurement devices (not shown) may also be provided to monitor the temperature of the polymer sheet being processed, among other variables. Although described with respect to heating sheet, other microwave heating apparatuses and processes may also be used with the microwave-sensitive polymers described herein.

The power rating for the microwave emitter used in the microwave heating apparatus may depend on the composition, size or thickness of the polymer specimen being heated, and the desired temperature. The power rating may also be selected based on variables such as the cycle time for operations occurring upstream or downstream from the heating stage. In certain embodiments, a variable power source may be used, providing process flexibility, such as the ability to vary a part size or composition (amount or type of microwave-receptive additive) or to accommodate small local differences in material composition, or desired temperatures.

Applications

Embodiments disclosed herein relate to the efficient conversion of thermoplastic materials using electromagnetic energy, by selectively heating a portion of the volume of the thermoplastic material, that portion being sufficient to render the material processable in a subsequent forming technique. As used herein, processable means the provision of sufficient melt-state or softening of at least a portion of the thermoplastic in order for the bulk plastic to be mixed, transferred, shaped, stamped, injected, extruded, etc., to form a product. The heating of the thermoplastic substrate may be achieved by the exposure of the thermoplastic to electromagnetic energy, such as microwaves, which have the ability to penetrate through the entire volume of the substrate and to be preferentially absorbed in microwave-sensitive regions.

By applying microwave radiation, heat may be generated locally at a predetermined region of the volume, bulk, or part of the polymer specimen. Thus, the amount of energy applied may be carefully controlled and concentrated, as other regions may consist of non-absorbing materials which are transparent to the radiation used. For example, untreated polypropylene and polyethylene are transparent to microwave radiation. By using materials that are receptive to microwaves, the energy used may be reduced, the cycle times shortened and the mechanical and other properties of the final material may be adapted and optimized for various requirements and applications.

Sites within the microwave-sensitive material may be either favorable or non-favorable for absorption of the electromagnetic energy. Sites that are favorably absorptive will readily and rapidly heat under the influence of electromagnetic energy. In other words, only a specified portion of the volume of the substrate will be strongly affected by the electromagnetic energy, relative to other regions of the material.

In this manner, the electromagnetic energy interacts with only certain regions of the substrate, which will increase in temperature when electromagnetic energy is present. The heating of neighboring regions within the bulk material will subsequently occur due to thermal conduction and other such mechanisms. As the bulk material is heated volumetrically, the material may be converted into a processable state more rapidly as compared to conventional heating techniques. Moreover, because that material may contain less heat energy than would normally be present had the entire bulk material been heated via surface conduction (infrared heating), there may be considerable savings in energy. For example, infrared heating results in significant energy losses to the atmosphere, and requires that the surface temperature of the part is significantly higher than the desired bulk temperature in order to effect an acceptable rate of heat transfer from the part surface to the part core and raise the core temperature to that required for processing. In contrast, microwave selective heating, which causes the temperature of the microwave sensitive polymer to heat rapidly and volumetrically to processing temperature, may result in a significantly lower polymer surface temperature, especially in such cases that comprise microwave transparent surface layers. Microwave heating may also have less tendency for energy to be lost from the system, transferring energy primarily to where it is needed, i.e. the microwave sensitive polymer. Microwave heating may also result in considerable savings in cycle time for a conversion process. The heating time may be reduced, not only because the microwave heating mechanism occurs rapidly throughout the bulk (in contrast to thermal conduction), but the total energy content of the part is less. The cooling cycle may also be reduced as the unheated regions of material effectively act as heat sinks to draw heat out of the neighboring heated regions, significantly enhancing the overall cooling rate of the bulk material.

The microwave-sensitive polymer of the present invention may be used during the primary conversion or secondary fabrication processes. For example, in some embodiments, the microwave-sensitive polymer may be used during the fabrication of polymeric articles including films, foams, profiles, compounded pellets, fibers, woven and non-woven fabrics, molded parts, composites, laminates, or other articles made from one or more polymeric materials. In other embodiments, the microwave-sensitive polymer may be used in conversion processes such as sheet extrusion, co-extrusion, foam extrusion, injection molding, foam molding, blow molding, injection stretch blow molding, and thermoforming, among others.

As described above, the microwave-sensitive polymers disclosed herein may be heated for subsequent processing, such as being mixed, transferred, shaped, stamped, injected, formed, molded, extruded, or otherwise further processed. In some embodiments, the microwave-sensitive polymers may be useful in thick sheet thermoforming processes, such as for forming refrigerator liners, for example. In other embodiments, microwave-sensitive polymers disclosed herein may be useful for the processing of air laid binder fibers, for example. In other embodiments, microwave-sensitive polymers disclosed herein may be useful in blow molding processes, such as for the formation of blown bottles, for example.

In other embodiments, microwave-sensitive polymers disclosed herein may be useful in applications where the polymer being processed is not completely molten. For example, microwave-sensitive polymers may be selectively heated, heating only a select portion of the polymer passing through the apparatus, thereby concentrating the heat energy to only that portion being further processed, such as by a forming, molding, or stamping process. This may enhance the structural integrity of the material handled during processing, may reduce cycle times, and may reduce the energy required for processing the material into the desired shape.

In other embodiments, microwave-sensitive polymers disclosed herein may be useful in embossed sheets. In conventional infrared thermoforming, heat input must pass through the surface of the sheet, and often reduces the retention of the embossing structure or surface details. In addition to the reduced heating cycles, as described above, microwave-sensitive polymers may allow for increased retention of embossing structures during processing due to the reduced energy footprint imparted to the sheet. For example, in a coextruded sheet designed for thermoforming, a microwave sensitive core layer enables the sheet to be heated from the inside out resulting in a cooler, more desirable sheet surface temperature.

In other embodiments, selective heating may allow the use of microwave-sensitive layers of polymer interspersed with non-sensitive layers. Layered polymers may provide for: optimum temperature profiling; the use of pulsed microwave energy during processing of the polymer; the selective placement of the microwave emitters providing for heating of specific regions of a part; and other manifestations which may provide for preferential or selective heating by virtue of the microwave sensitivity of one or more thermoplastic parts or layers.

Figure 2:
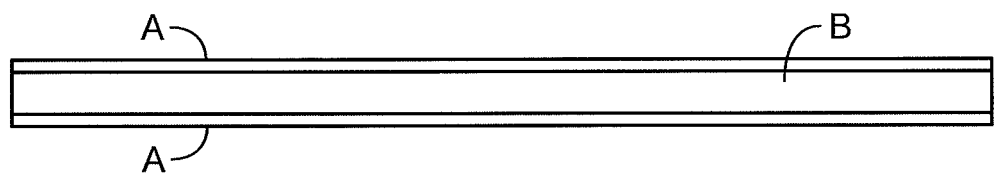
FIG. 2 illustrates one embodiment of a multilayered sheet incorporating a microwave-sensitive layer.

As one example of sheet extrusion, a microwave-sensitive layer may be incorporated into a multilayered sheet. For example, FIG. 2 illustrates one embodiment of a multilayered sheet incorporating a microwave-sensitive layer. The microwave-sensitive layer B may form a sheet core, bounded by outer layers A not sensitive to microwave heating. Incorporation of a microwave-sensitive core layer may facilitate subsequent processing of the sheet, such as during sheet thermoforming. In some embodiments, sheet thermoforming may be facilitated by use of a microwave selective polymer by enabling thick sheet thermoforming, selective drawability, and rapid, uniform heating of the sheet.

Layered sheets as disclosed herein may include 2 or more layers, where one or more layers may include or be formed from microwave-sensitive polymer compositions. For example, layered sheets may include 3, 4, 5, 6, . . . , up to 1000 layers or more. In some embodiments, individual layers may have an average thickness of 0.1 microns to 25 mm, and the total thickness of the sheet may range from 100 microns to 25 mm.

Although illustrated in FIG. 2 as a three layered sheet, in other embodiments a microwave-sensitive polymer may form a region or regions within a polymer structure. For example, the microwave-sensitive polymer may form a discrete layer in a sheet having two or more layers. In other embodiments, the microwave-sensitive polymer may form specific regions of a larger structure, allowing selective heating of those regions for further processing. In yet other embodiments, the microwave-sensitive polymer may form one side of a side-by-side fiber structure. In yet other embodiments, the microwave-sensitive polymer may form the core or the sheath of a core/sheath fiber structure.

In a foam extrusion process, for example, incorporation of a microwave-sensitive layer may allow selective heating of the foam core and the solid, non-sensitive skin, enabling shorter heating cycles while preventing collapse of the foam structure. In other embodiments, incorporation of different concentrations of the microwave absorbing species in each of the layers may allow differential heating of each of the layers and hence optimization of any subsequent fabrication step, such as thermoforming. In other embodiments, incorporation of a microwave-sensitive layer may allow selective foaming of a post-formed sheet.

In other embodiments such as injection molding or injection stretch blow molding, incorporation of a microwave-sensitive layer may allow shorter cycles due to the internal cooling of the polymer, where the non-sensitive portions or a part may act as heat sinks and therefore provide a reduced cooling time. Injection molding may also be facilitated by use of pulsed microwave energy, resulting in a mixture of molten and semi-molten material which can be injection molded, the semi-molten material acting as a heat sink during subsequent cooling of the part. Injection stretch blow molding may also benefit from the optimized thermal gradient resulting from microwave selective heating, allowing for improved mechanical properties of the final product.

Figure 3:
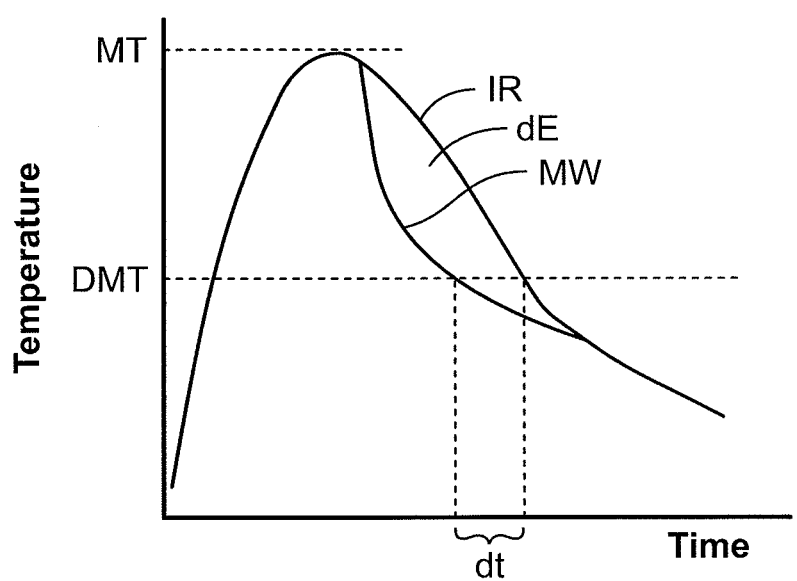
FIG. 3 is a graphical comparison of an infrared heating/cooling curve with a microwave heating/cooling curve, illustrating cooling cycle time reductions and the potential decreased energy resulting from the concept of a "heat sink" in the polymer system resulting from the use of pulsed microwave heating, or other means of providing relatively hotter and cooler regions in the part.

FIG. 3 illustrates the decrease in cooling that may be obtained according to one embodiment of the present invention as compared to a conventional heating cycle. In addition to rapidly heating a polymer, which may decrease the heating cycle and energy requirements, sheets, pellets, or fibers having a microwave-sensitive core may also be similarly heated to potentially result in a decreased cooling cycle. Comparing infrared heating/cooling curve "IR," as shown in FIG. 3, with microwave heating/cooling curve "MW," the core polymer may be heated, conducting energy out to the outer, non-sensitive layers. When heated sufficiently, to molding temp "MT," the part may be formed, injected, etc. Due to the continuing conduction from the warmer core to the non-sensitive polymer, the part may cool to the de-molding temperature "DMT" faster than a part would cool following conventional heating, resulting in cycle time reduction "dt." The area dE between curves IR and MW represents the reduced thermal load that may be achieved by microwave heating a polymer having a microwave-sensitive core.

In some embodiments, a layered thermoplastic sheet, containing microwave-sensitive and non-microwave-sensitive layers, may be selectively heated prior to thermoforming. In other embodiments, layered or co-extruded pellets of thermoplastic materials may be selectively heated prior to subsequent processing in for example, an injection molding process. These may result in accelerated cooling due to the presence of "internal heat sinks" described above, and hence reduced cycle time, similar to the layered sheet case described above.

In other embodiments, pulsed microwave energy may be used to create "slices," or discrete regions, of molten polymer interspersed with layers of un-melted polymer prior to subsequent processing. This may also result in accelerated cooling and hence reduced cycle time, similar to the layered sheet case described above.

In other embodiments, selective placement of one or more microwave emitters may allow selective heating of specific areas of a sheet or other thermoplastic part prior to subsequent processing. This may be particularly useful in thermoforming processes where the sheet must be deep drawn in a particular area.

In other embodiments, a process may use selective heating and consolidation of an absorbent core, such as that used in hygiene products which contain a bicomponent binder fiber containing a microwave-sensitive component (in particular polypropylene fibers or fibers containing a microwave-sensitive material such as a maleic-anhydride graft or other polar species) and cellulosic fibers. For example, in a fiber-forming process, the planar material may pass through a microwave heater with energy sufficient to partially melt the polymeric fibers and heat the cellulosic fibers, by virtue of their inherent moisture content. Subsequently the fibers may be consolidated into an absorbent core with in integrated network of polymeric fibers and cellulose. Alternatively, the construction may be a technical textile where the microwave-sensitive fiber may be used to bind together the woven or non-woven structure as a covered yarn.

In other embodiments, processes may use a blend of two polymers, one being receptive to microwave energy, the other being transparent, in such a way that the microwave-receptive domains can be selectively heated. The relative proportion of each of the polymers, the phase morphology, the concentration of the microwave-sensitive component and the power applied may be used to control the rate of heating of the microwave-sensitive phase and hence the rate of heating of the total composite.

In other embodiments, selective heating may allow the use of a microwave-receptive reinforcing member within a transparent polymer matrix. The reinforcing member may take the form of a continuous mesh or net, a woven or non-woven fabric, continuous filaments or discontinuous, staple fibers. The reinforcing member may also be polymeric in nature or may comprise other non-polymeric, microwave-sensitive materials, such as carbon or metals.

In other embodiments, microwave-receptive polymers may be used in the skin and/or core of a three (or more) layered foam structure (for example, a sheet), comprising solid skins and a foam core. The concentration of the microwave-receptive components may be varied in each of the layers and the microwave power selected in order to achieve both rapid heating of each of the layers and the desired temperature distribution through the whole structure immediately prior to subsequent processing. This may eliminate the need for the very gradual heating required in infrared heating processes to achieve the desired thermoforming temperature profile without premature foam collapse.

In some embodiments, microwave-receptive components in the form of zeolites, inorganic hydrates, or polymer hydrates in a thermoplastic polymer matrix (for example, a thermoplastic sheet) may be used. The zeolites may contain water within the zeolitic structure, may be heated using microwave energy, and the thermoplastic matrix subsequently re-shaped. For example, in the case of a sheet, the sheet may be formed into a container. The shaped container may subsequently be reheated, releasing the water from the hydrated additive as steam, which may act as a blowing agent causing the thermoplastic matrix to expand into foam.

In other embodiments, the use of microwave-receptive materials on the skin layer of a packaging sheet used in the aseptic packaging process of food products to selectively heat the skin layer may eliminate the need for hydrogen peroxide or steam sterilization.

EXAMPLES

In some embodiments, the microwave-sensitive polymer may be incorporated as a discrete layer (or several layers) in a multi-layered structure in such a way that the microwave-sensitive layers) may be preferentially heated prior to subsequent fabrication or processing. Heat energy will then be conducted from these layers to the adjacent polymer layers which are essentially "transparent" to microwave energy, thereby allowing the total polymer structure to reach the required fabrication temperature more rapidly than with a conventional heating system. In some embodiments, the A/B/A structure may be useful in thermoforming semi-crystalline materials such as polyolefins or polyamides.

The following examples include modeling predictions and experimental results for multilayered structures, and examples of cycle times for pulsed microwave energy during injection molding.

Example 1

Modeling of the Microwave Selective Heating Process

Referring to FIGS. 4-7, results from modeling the microwave heating and the radiant heating of a three layer A/B/A sheet system similar to that illustrated in FIG. 2, where the A layers may be essentially transparent to microwave energy, and the B layer may be sensitive to microwave energy, are shown. The multilayer A/B/A structure may be heated by microwave energy such that the B layer is heated preferentially. The heat energy may then be conducted to the A layers.

For example, the microwave heating device described above in relation to FIG. 1 may be used to heat a polymer sheet. Heating the A/B/A structure in this or a similar manner may be useful in thermoforming, as it results in a "reversed" temperature profile through the cross section of the sheet as compared to conventional radiant or contact heating. The reversed temperature profile may be better illustrated by comparing FIGS. 4 and 5 with FIGS. 6 and 7, where the A layers are cooler than the B layer for microwave heating, and the outer top layer is the warmest with radiant heating.

Figure 4:
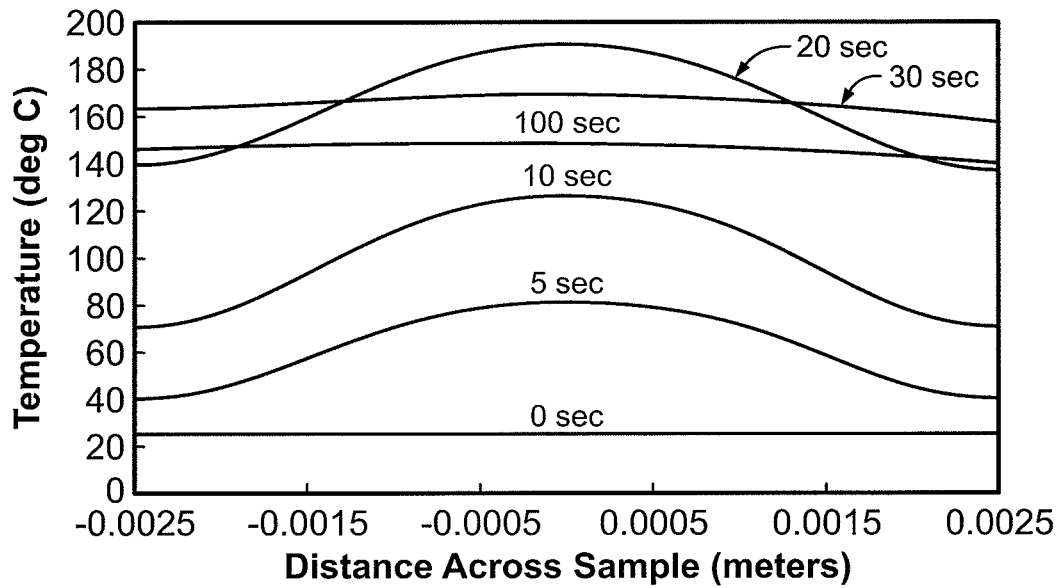
FIGS. 4 and 5 present modeling results for the thermal response of a three layer sheet system in a microwave heating system.
Figure 5:
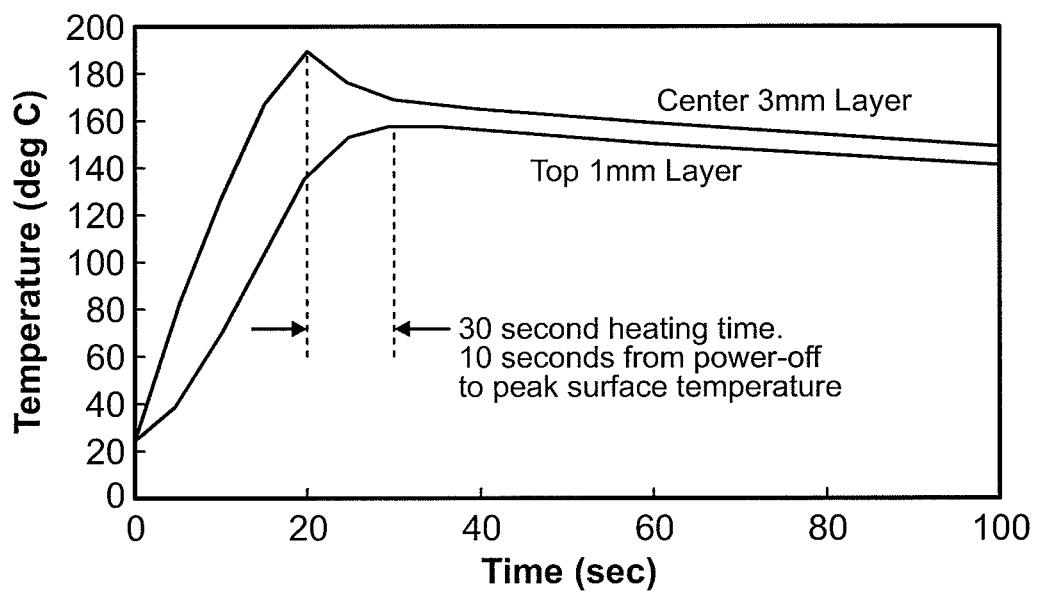

As illustrated in FIGS. 4 and 5, microwave heating results in heating the middle, microwave-sensitive layer, as illustrated in FIGS. 4 and 5. The heat is then conducted to the outer layers. For this simulation, the sheet was exposed to microwave energy for 20 seconds to bring the core temperature up to 160° C. The top layer reaches a peak temperature 10 seconds after the microwave power is turned off. Conduction brings the entire sheet to approximately 160° C. after approximately 30 seconds total elapsed time, with a temperature differential of less than about 20 degrees across the thickness of the multilayer sheet.

Figure 6:
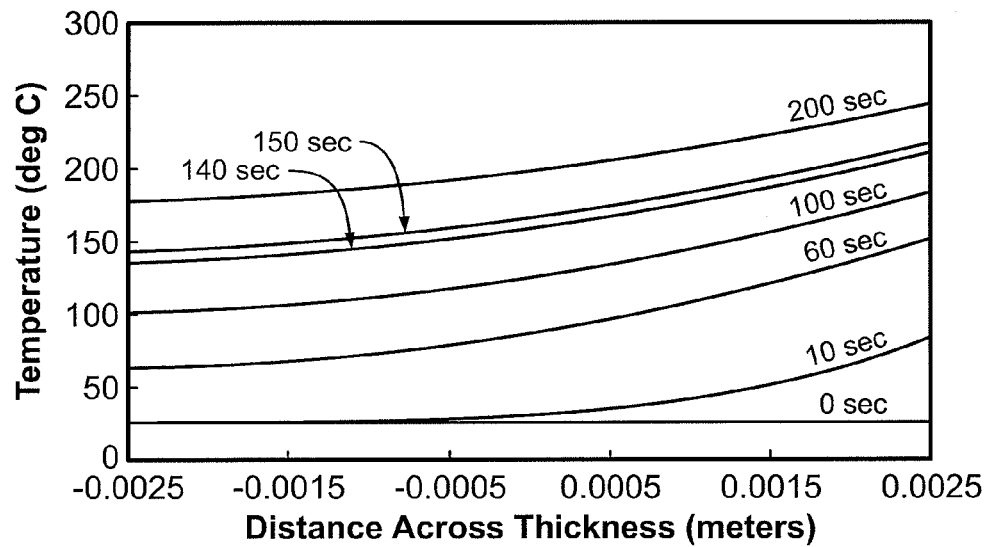
FIGS. 6 and 7 present modeling results for the thermal response of a three layered sheet system in a conventional radiant heating system.
Figure 7:
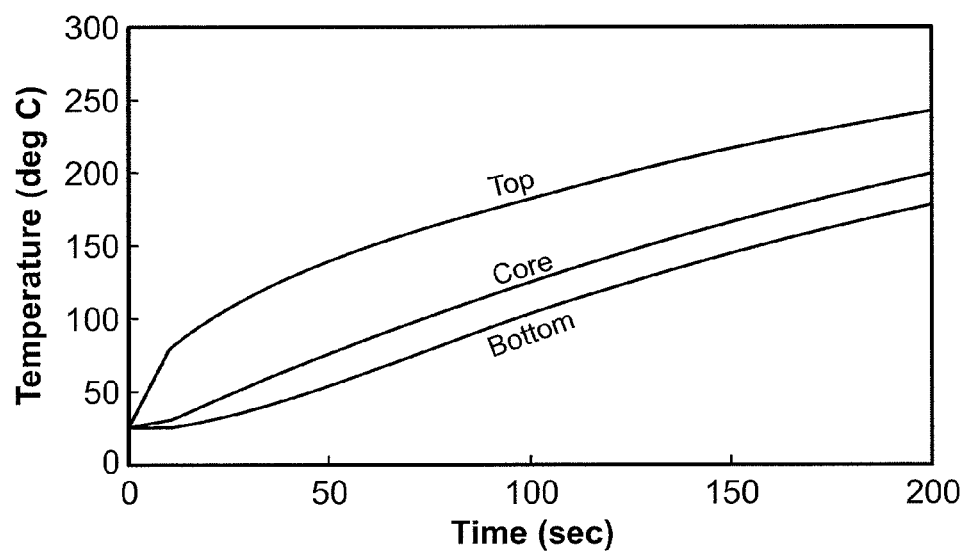

As illustrated in FIGS. 6 and 7, radiant heating exposes the top layer to heat, which must then be conducted to the lower layers. Conduction to the lower portions of the sheet may require a significant amount of time, 150 seconds, to bring the core temperature up to 160° C. The entire sheet reaches 160° C. at approximately 170 seconds, with approximately a 70° C. differential temperature between the top and bottom layers.

The above simulation results indicate that microwave heating may result in a faster heating cycle and a more uniform temperature distribution through the sample. Another difference observed when comparing microwave and radiant heating is the response of the sample following heating. For microwave heating, response to the power-off state is immediate, and the melt region is contained, as illustrated in FIGS. 4 and 5. In contrast, for radiant heating, an immediate response to the power-off state is more difficult to achieve, and melt regions are not contained, as illustrated in FIGS. 6 and 7.

As illustrated in FIGS. 4-7, selective microwave heating may result in A layers that are cooler than the B layers, and may result in higher melt strength in the A layers, and hence a broader processing window. The multilayer structure may also be specifically designed to provide an optimum temperature profile through the sheet for thermoforming, by varying the number, location, and thickness of each of the layers of microwave-sensitive polymer, the proportion of microwave-sensitive additive contained in each, and the applied power level. In this manner, the entire sheet may be heated rapidly to the desired temperature for thermoforming without exposing the surface of the sheet to the very high temperatures inherent in a radiant heating system, required to ensure sufficient "temperature driving force" to minimize the heating time required. The concept of selective heating of a layered structure may also facilitate accelerated cooling after forming due to the conduction of heat energy from the hotter (microwave heated) layers to the cooler (microwave transparent) layers during the forming and subsequent cooling phases. The microwave transparent layers may essentially act as "internal heat sinks" within the polymer structure.

Example 2

Decreased Heating Cycle Time

Figure 8:
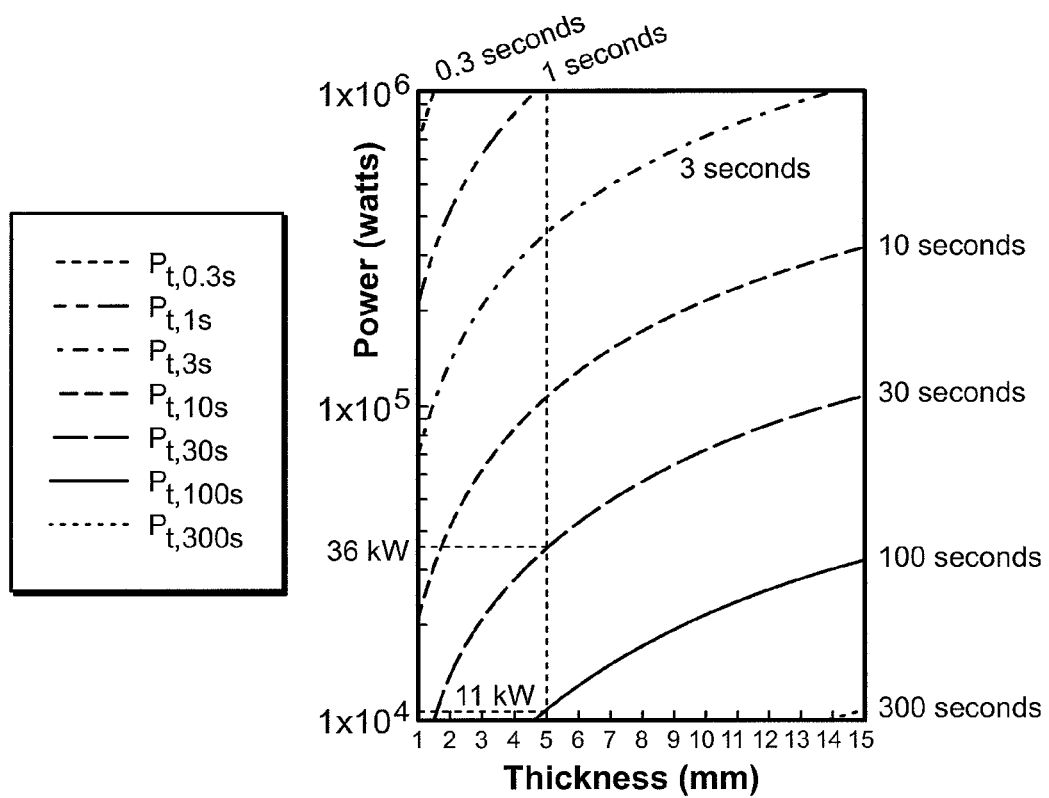
FIG. 8 presents modeling results for the thermal response of a three layered sheet system, where the power requirements are calculated based upon the thickness of the sheet and the desired heating time.

The models used to generate the results above were also used to estimate the effect microwave-sensitive polymers can have on the thermoforming cycle, specifically the heating cycle. The time required to heat layered sheets (A/B/A polypropylene sheet, where 60% of thickness is the microwave-sensitive core B) to typical thermoforming temperatures was estimated: the wattage required to heat a sheet of a specified thickness in a specified time was calculated, the results of which are presented in FIG. 8. The results indicate that power requirements around 100 kW may result in heating cycle times as low as 3 seconds, which may represent a significant decrease in the cycle time. For thick sheets (10 mm or greater), cycle times of 300 seconds, comparable to that achieved with conventional heating systems, can be achieved with low power requirements.

The cycle time estimated for microwave heating systems is compared with conventional thermoforming heating systems for sheet in Table 1. Again, for an A/B/A layered polypropylene sheet, where the B layer is microwave-sensitive and is approximately 60 percent of the sheet thickness. The microwave heating may be performed by a 12-cell microwave heating system, similar to that illustrated in FIG. 4, described above. The selective heating may result in a reduction of the heating cycle time by 90 percent or more, and may decrease the energy required for the heating by 75 percent.

above) is compared with conventional injection molding heating systems in Table 2. The microwave-sensitive polymer is heated with a pulse of microwave energy, melting the pellet containing non-receptive and receptive polymer, the melt then injected into the cavity. Due to the conduction of heat from the receptive to the non-receptive polymer, the pellet/melt has an internal heat sink, enhancing the cooling cycle

TABLE 1

| PP Sheet | Conventional Thermoforming Station (width = 1 m) | | | Microwave Heating System (12-Cell, width = 1.032 m) | | | | |
|---|---|---|---|---|---|---|---|---|
| Thickness (mm) (A/B/A thickness) | Total Electrical Power Required (kW) | Cycle Time (s) | Total Energy Audit (kW-seconds) | Total Electrical Power Required (kW) | Cycle Time (s) | Total Energy Audit (kW-seconds) | Decrease in Cycle Time (%) | Decrease in Required Energy (%) |
| 10 (2/6/2) | 30 | 400 | 11800 | 100 | 30 | 3000 | 92 | 75 |
| 10 (2/6/2) | 30 | 400 | 11800 | 30 | 100 | 3000 | 75 | 75 |
| 5 (1/3/1) | 30 | 200 | 5900 | 51 | 30 | 1550 | 85 | 74 |
| 5 (1/3/1) | 30 | 200 | 5900 | 16 | 100 | 1600 | 49 | 73 |
| 2 (0.4/1.2/0.4) | 30 | 80 | 2400 | 59 | 10 | 590 | 87 | 75 |
| 2 (0.4/1.2/0.4) | 30 | 80 | 2400 | 21 | 30 | 620 | 62 | 74 |

Figure 9:
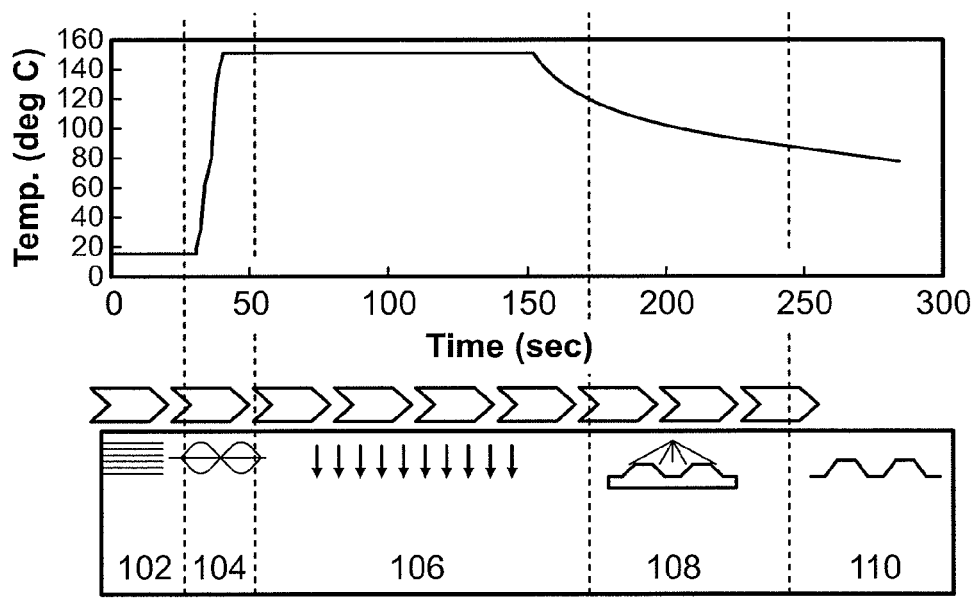
FIG. 9 illustrates one embodiment of a thermoforming process incorporating the selective microwave heating of a multilayered sheet.

Selective heating of sheet containing microwave-sensitive polymer layer(s) may be performed in a process similar to that illustrated in FIG. 9. Sheet stock 102 may be fed to a microwave array 104, where the sheet may be heated to the desired temperature. The heated stock may then be forwarded, at temperature, to a thermoformer mold bed 106 with low power IR emitters, and then formed, cooled, and ejected 108 to form molded part 110.

The upper portion of FIG. 9 illustrates the above steps with the corresponding estimated time required for one example of thermoforming a sheet using selective heating and estimated polymer temperature throughout the process. For the time-temperature plot shown in FIG. 9, the sheet was a 6 mm thick polypropylene sheet having an inner core layer of microwave-sensitive polypropylene (A/B/A=1.5 mm/3 mm/1.5 mm). The microwave heating array was at a power setting of 22 kW.

The time-temperature plot in FIG. 9 illustrates the significantly reduced heating time, approximately 30 seconds, for microwave-sensitive polypropylene. In contrast, it is estimated that using conventional thermoforming/heating processes, it would take approximately 200 seconds for polypropylene and 85 seconds for polystyrene, each of similar thickness. The significantly reduced heating times for microwave-sensitive polymers may result in a lower part cost due to the decreased cycle time resulting from the reduced heating time.

The cycle time estimated for pulsed microwave heating systems for injection molding systems (such as in FIG. 5, time. The cycle time reduction was estimated at 60 percent for thicker parts, approximately 25 percent for smaller parts.

TABLE 2

| PP Part Thickness (mm) | Initial cold core (non-receptive) pellet size (mm) | Overall (outer) pellet diameter (mm) | Time at injection point (s) | Conventional Cycle Time (s) | Internal Cooling Enhanced Cycle Time (s) | Percent Reduction in Cycle Time (%) |
|---|---|---|---|---|---|---|
| 10 | 6 | 6.93 | 10 | 300 | 120 | 60 |
| 5 | 4 | 2.24 | 1 | 72 | 57 | 21 |
| 2 | 2 | 2.24 | 1 | 10 | 7.5 | 25 |

Example 3

Heat Testing of Microwave-Sensitive Polymers

Figure 10:
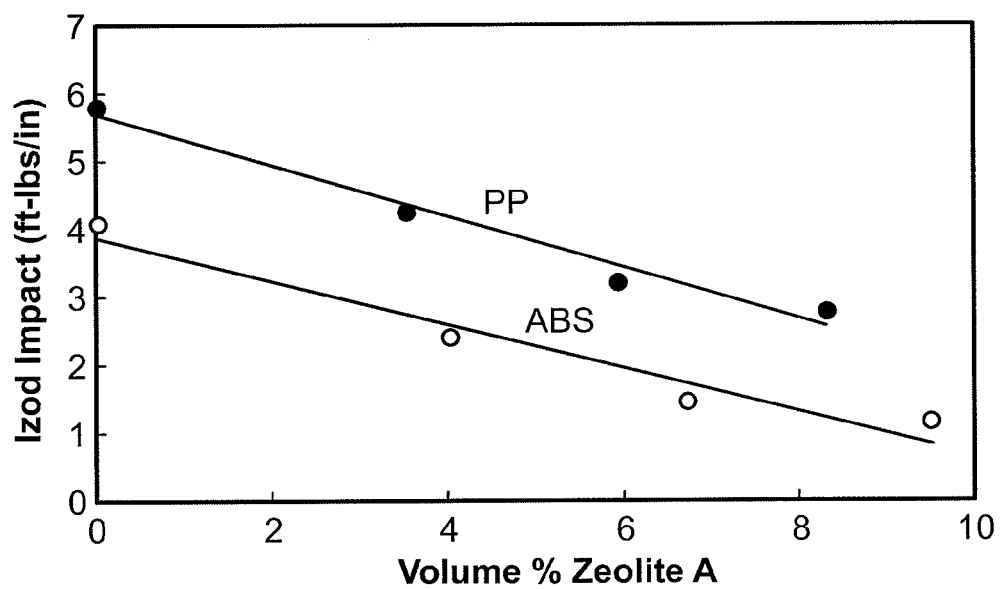
FIG. 10 presents Izod impact data for PP and ABS with and without microwave-sensitive additives.

Zeolite A and iron oxide ($Fe_3O_4$) were evaluated in selective heating processes. Criteria used to select these two additives included effectiveness (response to microwave energy), cost, and required loading of the additives, environmental, health and safety concerns. The expected impact that the additives may have on polymer properties (based upon particle size, morphology, and other properties) were also considered. For example, FIG. 10 presents laboratory data illustrating the decrease in Izod Impact that Zeolite A can have on PP and ABS.

The chosen additives were used at four loading levels (approximately 3, 6, 10, and 14 volume percent) in polymer sheets of varying thickness (3, 6, and 10 mm), where the polymers included ABS, HIPS, PP, and Conductive TPO. The microwave heating of the polymer sheets was then tested in an apparatus similar to that illustrated in FIG. 1, described above (microwave heating apparatus 20 includes components such as tuning pistons 21, EH tuner 22, matching iris plates 23, waveguide 24, horn 25, microwave choke 27, lower moveable piston 28, and sample feed slot 29). Sheets were processed through the microwave heating apparatus by feeding the samples through the sample feed slot. The test apparatus was capable of rapid and uniform heating of polymers, and could adapt to the material nature and form (receptor type, receptor concentration, matrix type, and sample thickness and shape). The test apparatus included a 2.54 GHz variable power source, and a WG9A waveguide connection into the horn, providing a uniform energy density spread. The iris plates and EH tuner allowed for fine tuning of the wavelength emitted. Analytical measurement devices (not shown) were also provided to monitor the temperature of the polymer sheet being processed, among other variables.

Figure 11:
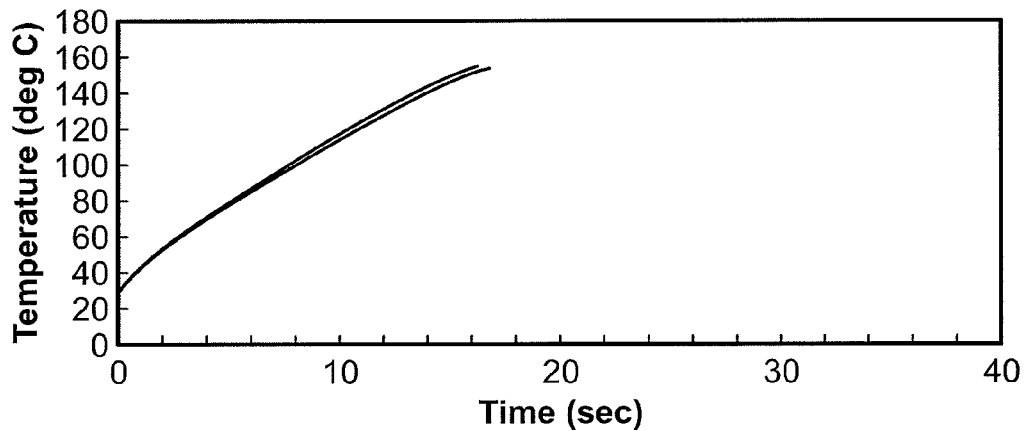
FIG. 11 presents the time-temperature response for the microwave heating of a polypropylene sheet useful in embodiments described herein.

Referring now to FIG. 11, a polypropylene sheet, 6 mm thick, having 6 volume percent Zeolite A was heated using the microwave heating apparatus at a power setting of 1100 Watts, and the temperature of the sheet was measured as a function of time. The sheet increased from room temperature to approximately 155° C. in about 17 seconds, indicating a rapid heating cycle.

Figure 12:
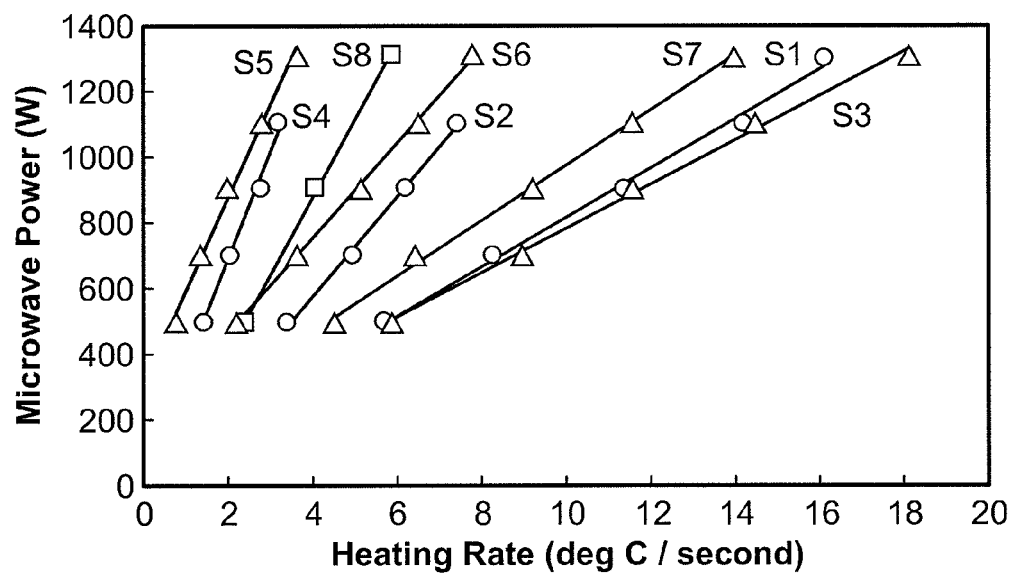
FIG. 12 presents the measured heating rate as a function of microwave power for several polymers containing Zeolite A, a microwave-receptive additive.

Referring to FIG. 12, the measured heating rate as a function of microwave power for several samples containing Zeolite A is shown. Eight samples as described in Table 3 were prepared. The increase in temperature of the samples was measured as the samples were heated at a constant microwave power. At moderate to high power settings, Samples 1, 3, and 7 exhibited rapid heating rates (greater than about 7° C. per second); Samples 2, 6, and 8 moderate heating rates (2 to 6° C. per second); and Samples 4 and 5 slow heating rates (less than about 2° C. per second).

TABLE 3

| Sample No. (#) | Polymer Base (type) | Sheet Thickness (mm) | Zeolite A Content (volume percent) |
| --- | --- | --- | --- |
| 1 | PP | 6 | 14 |
| 2 | PP | 6 | 6 |
| 3 | ABS | 6 | 14 |
| 4 | PP | 10 | 14 |
| 5 | ABS | 3 | 3 |
| 6 | ABS | 3 | 10 |
| 7 | ABS | 6 | 10 |
| 8 | TPO | 6 | 0 |

Figure 13:
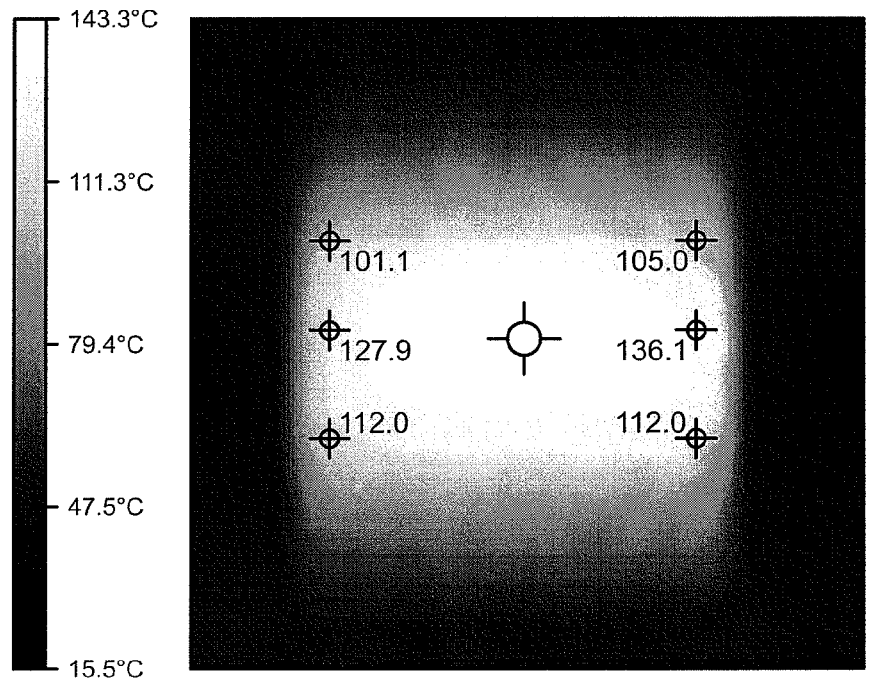
FIG. 13 presents the temperature profile measured for a sample of sheet being heated in a microwave heating apparatus, illustrating the uniform heating that can be achieved with selective microwave heating.

Referring to FIG. 13, the temperature profile measured for a sample in motion being heated in a microwave heating apparatus is shown. The sample was a nylon strip, 6 mm thick, 85 mm in width, and 500 mm in length. The sample moved through the apparatus at a rate of 400 mm/min at a power setting of 500 W. FIG. 13 presents a snapshot in time of the stabilized temperature profile resulting from the heating, and illustrates the uniform heating that can be achieved with selective microwave heating.

Figure 14:
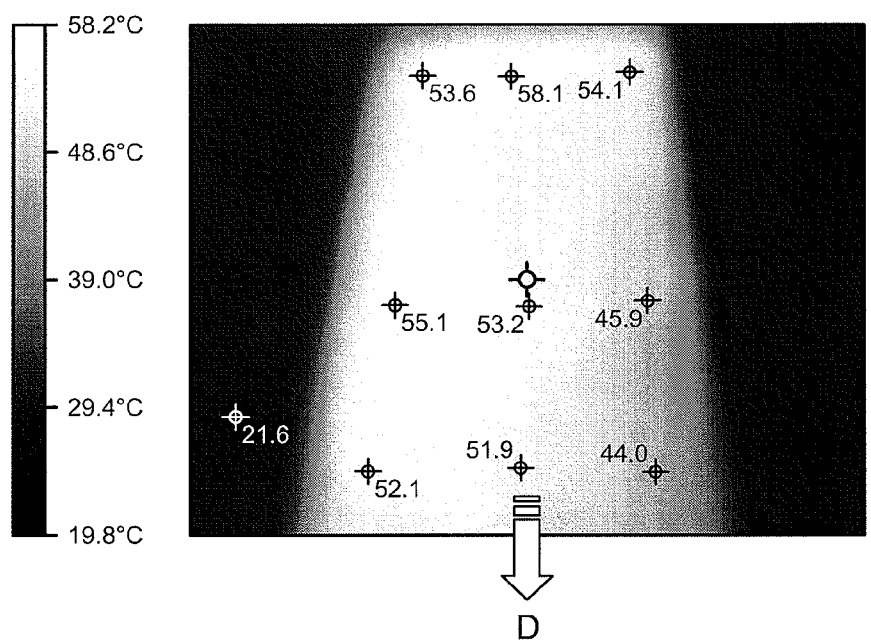
FIG. 14 presents a temperature profile measured for an A/B/A sheet sandwich sample being heated in a microwave heating apparatus, illustrating the uniform heating that can be achieved with selective microwave heating.

Referring to FIG. 14, a temperature profile measured for an A/B/A sandwich sample being heated in a microwave heating apparatus is shown; the A layers were non-receptive to microwaves, the B layer was receptive. Experimental results confirmed that the layered concept provides a uniform heating band, similar to that predicted by E-field modeling as described above.

Figure 15:
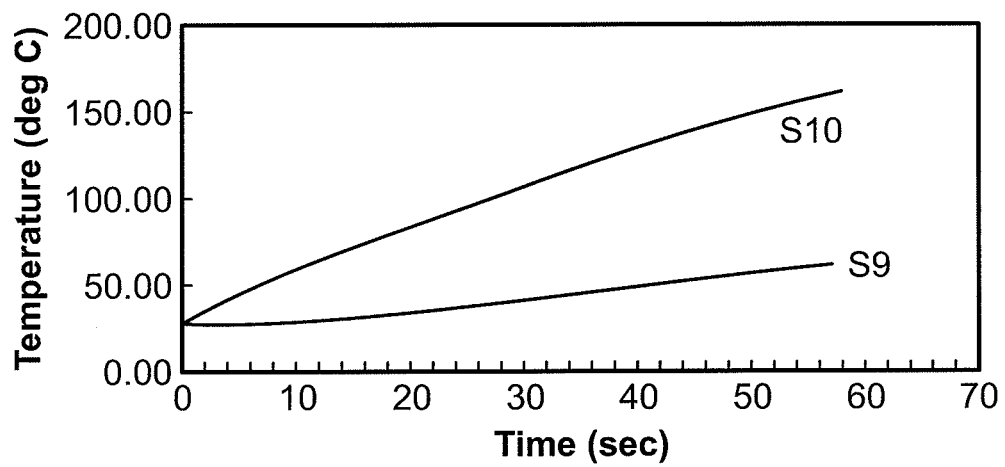
FIG. 15 presents the heating characteristics measured for two PP samples of a three layered sheet comprising a core layer of microwave-sensitive material.
Figure 16:
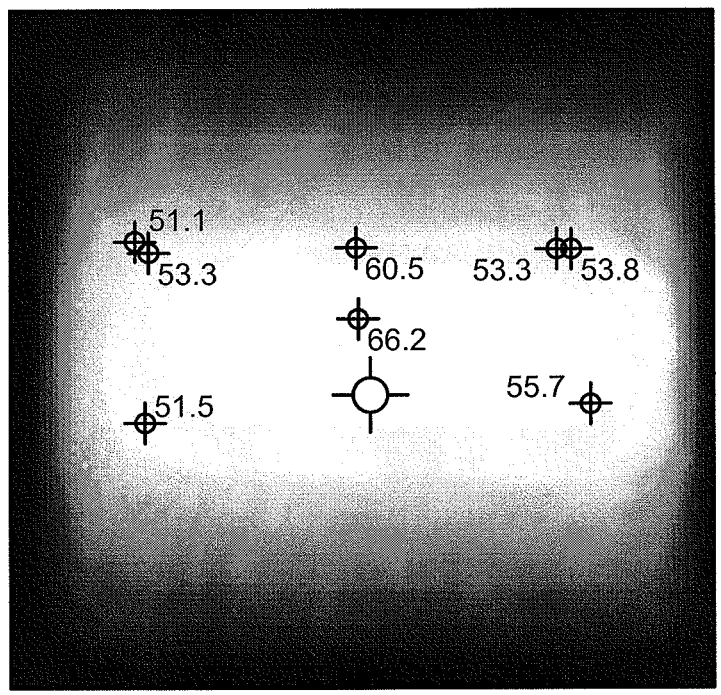
FIG. 16 presents a temperature snapshot of the heating profile for one of the two PP samples in FIG. 15, where the snapshot was taken two minutes into the heating process.

Referring now to FIG. 15, the heating characteristics measured for two 3 mm PP samples of a three layered sheet comprising a core layer of microwave-sensitive material bounded by outer layers of a polymer transparent to microwave energy are shown. For both samples, the core layer contained 10 volume percent Zeolite A. Sample 9 had a top layer (outer skin), whereas Sample 10 did not have a top layer. The samples were exposed to microwave energy at a power setting of 500 W. Sample 9, having a top layer, heated much slower than Sample 10, not having a top layer. FIG. 16 presents a time-temperature snapshot of the heating of Sample 9 two minutes from the start of the test, illustrating again how the outer layers lag behind as thermal conductivity transfers heat from the microwave-sensitive layer to the outer layers. In this manner, the outer layers may act as a carrier for a low melt strength core.

Figure 17:
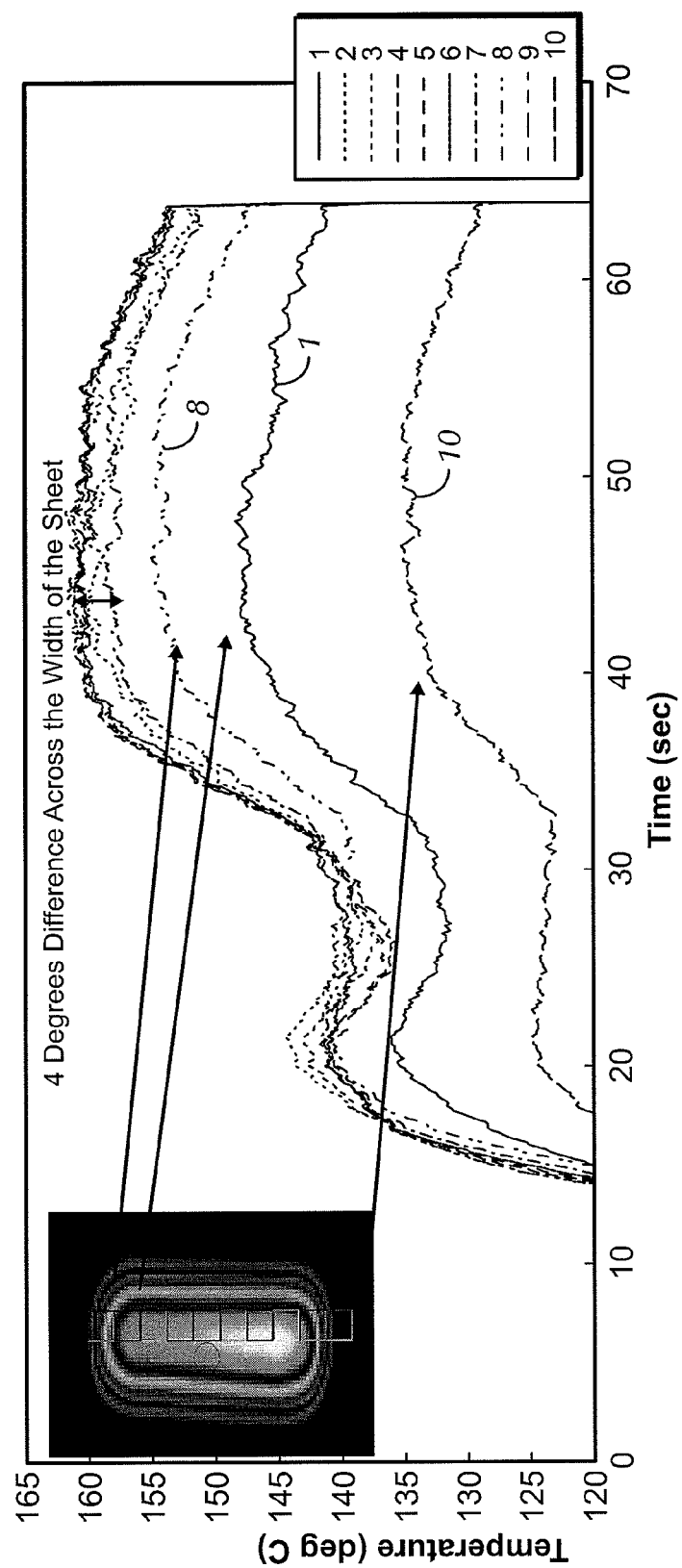
FIG. 17 presents a temperature snapshot of a heating profile for a PP sample heated using a microwave heating/thermoforming apparatus similar to that illustrated in FIG. 1.
Figure 18:
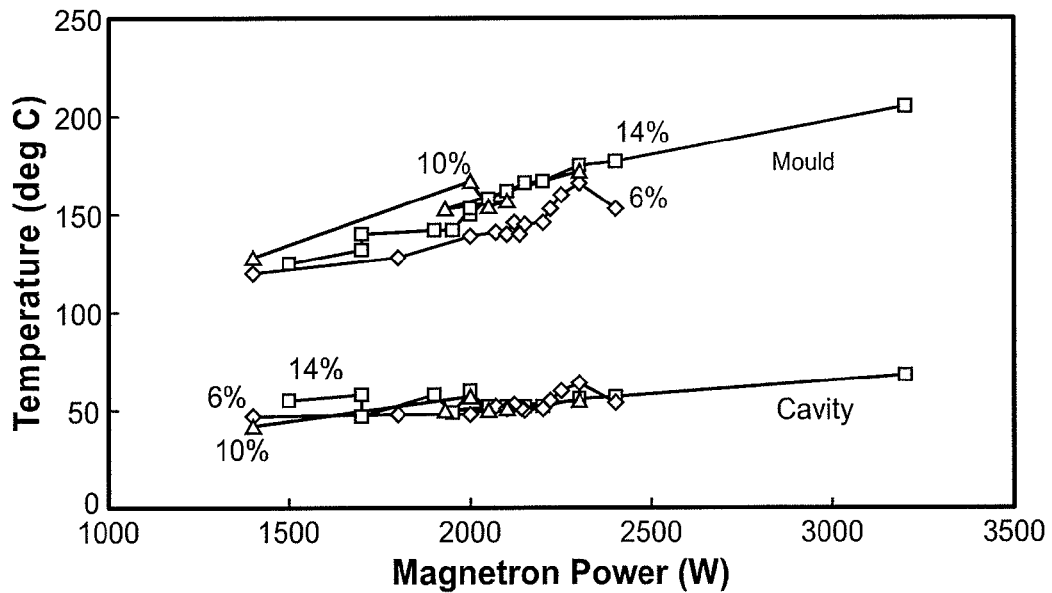
FIGS. 18-23 present microwave heating results for various samples processed dynamically, where a microwave-sensitive polymeric sheet is passed through a microwave cavity at a fixed speed, according to embodiments described herein.
Figure 19:
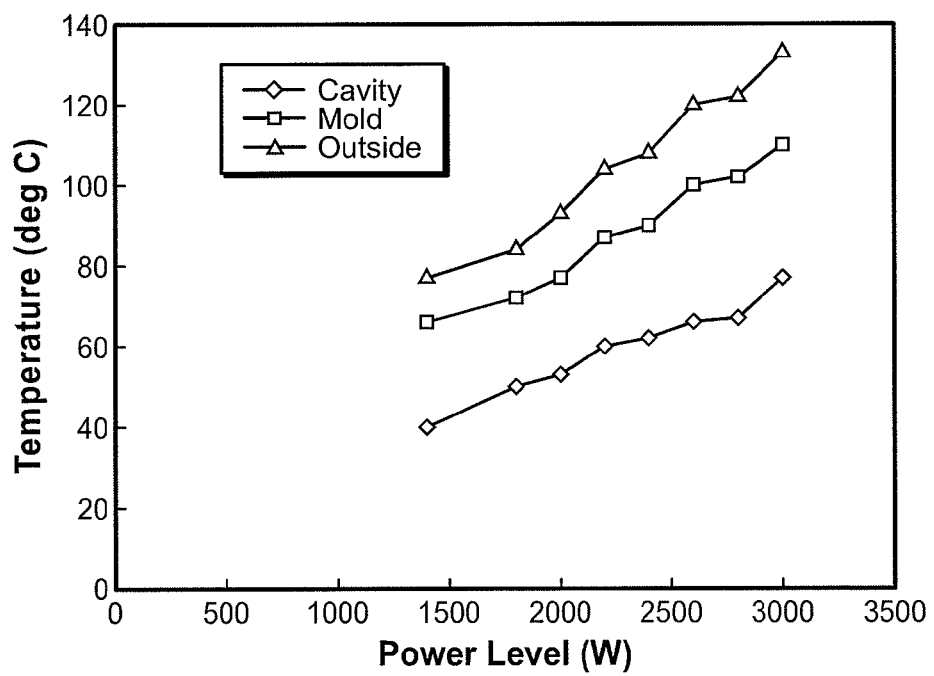
Figure 20:
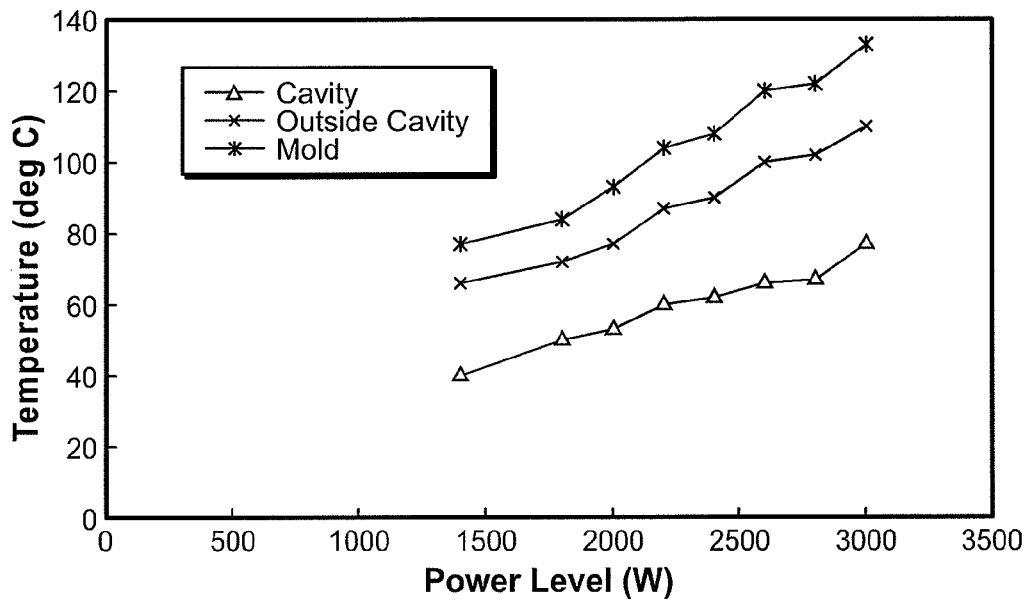
Figure 21:
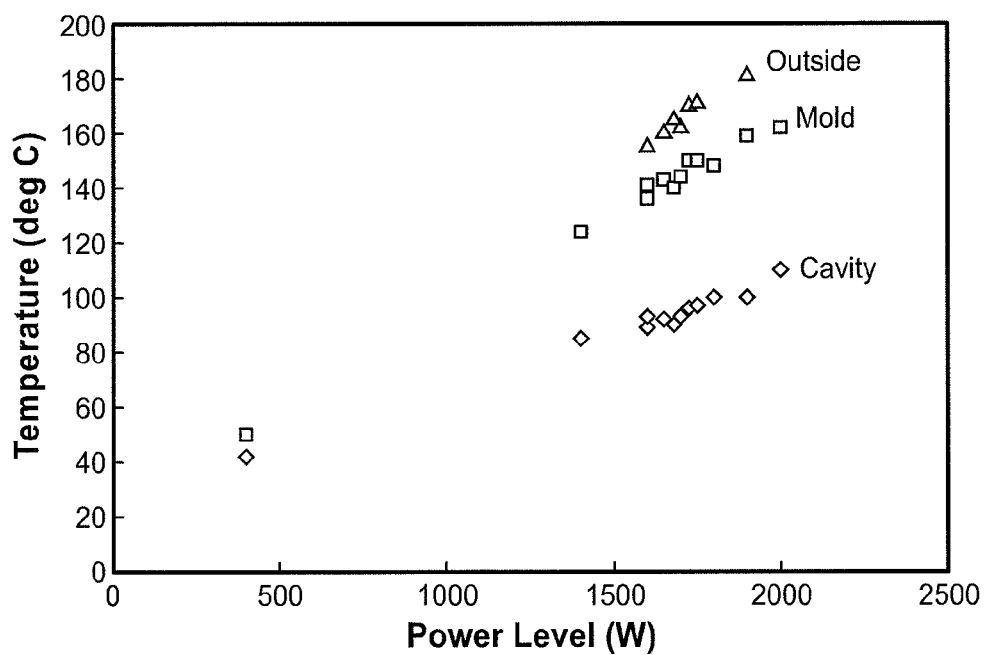
Figure 22:
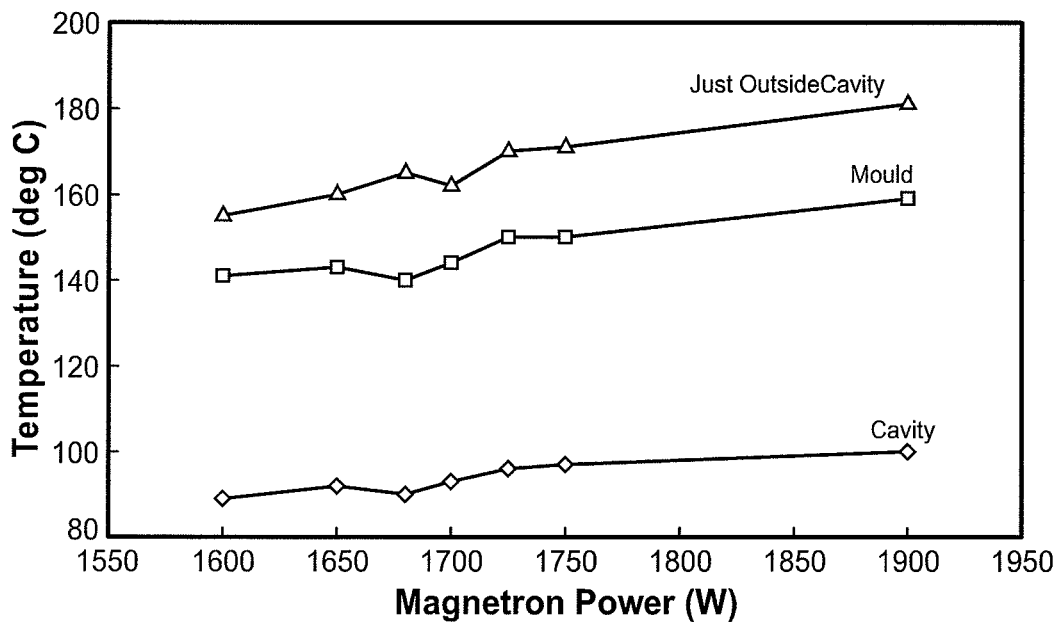
Figure 23:
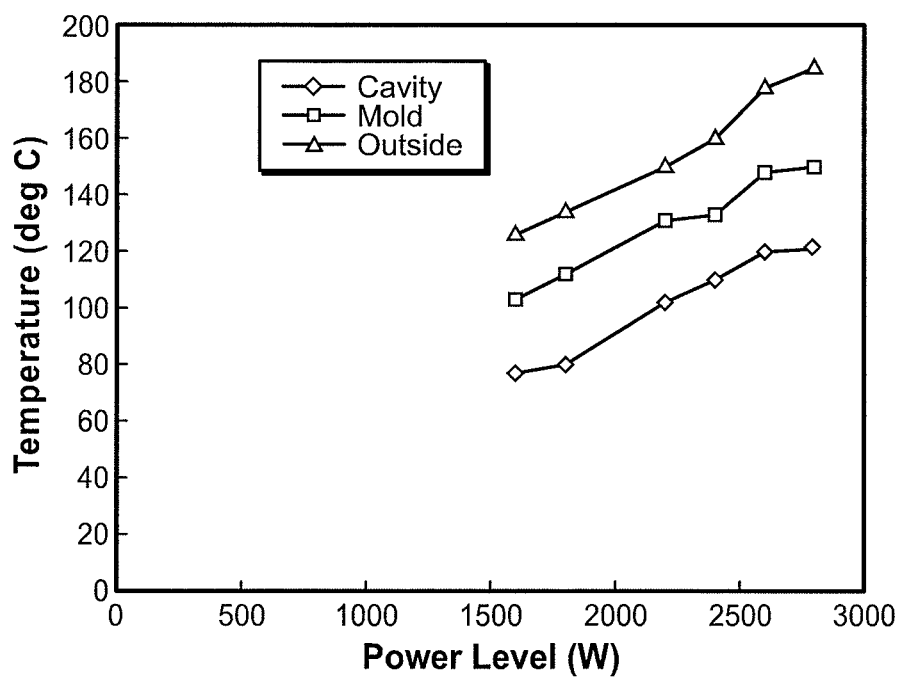

Referring now to FIG. 17, a temperature snapshot of the heating of a polypropylene sample (4 mm thick 20/60/20 co-extruded PP material with 14% zeolite A in the core material) using a microwave heating apparatus and thermoforming station similar to that as illustrated in FIG. 1 is illustrated. The polypropylene sheet contains 14 weight percent of a microwave-receptive additive (Zeolite A) and is heated in a microwave heating apparatus having a power rating of 1.5 kilowatts as the polymer sheet is passed through the microwave heating apparatus at a rate of 3 mm/second. Microwave energy was directed only toward the central portion of the sheet, selectively heating that portion of the sheet to be molded. As can be seen in FIG. 17, the temperature profile across the heated section varied by only 4 degrees Celsius, illustrating sufficiently uniform heating across the sample width for forming the desired molded part.

Example 4

Referring now to FIGS. 18-23, results for the dynamic heating of microwave-sensitive polymeric samples in a microwave heating apparatus, similar to that illustrated in FIG. 1, are illustrated. Monolayer and co-extruded polypropylene sheets (20/60/20 co-extruded structure) polypropylene sheets (PP D114) having a zeolite (Zeolite A) loading ranging from 3 to 14 weight percent were heated in a microwave heating apparatus, where the sheets were fed through the resonant cavity at a rate of 10 mm/second. Following the heating step, the polymer sheet was forwarded to a mold at the same transport rate as the feeding rate through the applicator. The mold was positioned at a 300 mm distance from applicator. The power level of the microwave generator was varied, and the resulting temperatures of the polymer sheets were measured. Temperatures were measured 1) inside the resonant cavity, 2) as the polymer exits the cavity, and 3) at the location of the mold. Temperature versus power level results for the various samples are presented in FIG. 18 (coextruded PP samples) and FIGS. 19-22. Additional monolayer samples were heated at a rate of 5 mm per second, results of which are presented in FIG. 23.

As another example, thermoforming a sheet into a refrigerator liner requires the polymer to have a good balance of stiffness and toughness, sufficiently high low-temperature impact properties, good ESCR, and good temperature resistance. Additionally, the polymer must have a deep draw processing window, having good melt strength and limited sag. The A/B/A layered polymer, having improved melt strength and decreased sag during thermoforming as a result of the reverse temperature profile may enable the thermoforming of TPO sheet for refrigerator liners and similar thick sheet applications.

Embodiments of the present invention provides for rapid, volumetric heating of a thermoplastic material. Embodiments provide for selective heating of discrete parts of a thermoplastic structure, such as individual layers in a laminated or co-extruded multilayer structure, for example. Other embodiments provide for pulsed microwave energy resulting in regions of heated and unheated microwave-receptive material. Some embodiments provide for selective placement of the microwave emitters providing for heating of specific regions of a part. In other embodiments, selective microwave heating, having high penetration efficiency, allows near simultaneous heating of the core layer and the skin layers, especially as compared to the slow conductive transfer of radiant heat from one or both outer layers through the polymer.

Embodiments disclosed herein may be used for the selective microwave heating of thermoplastic polymer materials. With regard to polymer processing, this technology offers many advantages for designers and processors, including selective, rapid heating; reduced heating/cooling cycle times (high speed); high energy efficiency and other environmental benefits such as reduced emissions (as it is a dry and fumeless process) and increased recycling potential (through enabling the more widespread use of self-reinforced single material components); preservation of properties in self-reinforced parts (reduces risk of reversion); increased productivity; improved part quality and strength; and minimization of thermal degradation due to reduced residence time in a thermal process, and therefore thermal stabilization additives can be reduced in polymer formulation.

Advantageously, embodiments disclosed herein may provide reduced heating times, reducing overall fabrication cycle time and hence reduced piece part cost. Embodiments disclosed herein may also provide reduced cooling times as a result of the use of selective heating, introducing "heat sinks" within a material that is being processed. Additionally, volumetric heating eliminates the need for "surface" or "contact" heating and therefore eliminates the potentially deleterious effects of high polymer surface temperatures. Volumetric heating also eliminates the undesirable temperature gradient through the sheet thickness.

Embodiments disclosed herein may also advantageously provide improved productivity through reduced overall cycle times and reduced system energy requirements. Embodiments disclosed herein may also provide tailored thermal profiling providing optimum thermoforming conditions for all thermoplastic materials and, in particular, enabling the thermoforming of thick thermoplastic polyolefin sheet, which otherwise has an unacceptably narrow processing window.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A method for processing a microwave-sensitive thermoplastic material, the method comprising:
admixing at least one thermoplastic material that is substantially transparent to microwave energy and at least one microwave-receptive additive to form a microwave-sensitive thermoplastic material;
removing water from the at least one microwave-receptive additive;
passing the microwave-sensitive thermoplastic material through a microwave heating apparatus;
exposing the microwave-sensitive thermoplastic material to microwaves in the microwave heating apparatus to increase the temperature of the microwave-sensitive thermoplastic material; and
melt processing the microwave-sensitive thermoplastic material, and
wherein each microwave-receptive additive is selected from the group consisting of zeolites, hydrated minerals, clays, and clays modified with microwave-receptive compounds.

2. The method of claim 1, wherein the microwave-receptive additive has a receptive nature over a frequency in a range from 1 MHz to 300 GHz.

3. The method of claim 2, further comprising tuning a microwave wavelength emitted from the microwave heating apparatus.

4. The method of claim 1, further comprising disposing the microwave-sensitive thermoplastic material as a layer in a multi-layered composite.

5. The method of claim 4, wherein the multi-layered composite comprises the microwave-sensitive thermoplastic material layer and at least one microwave-transparent layer.

6. The method of claim 5, wherein the multi-layered composite has a total thickness from 100 microns to 25 mm.

7. The method of claim 5, wherein the multi-layered composite comprises a core of the microwave-sensitive thermoplastic material layer bounded by microwave-transparent outer layers.

8. The method of claim 7, wherein the removing water from the at least one microwave-receptive additive comprises drying the layered sheet, forming the layered sheet in a vented extruder, drying the microwave-receptive additive, or combinations thereof.

9. The method of claim 7, further comprising using the multi-layered composite as a component in a refrigerator.

10. The method of claim 1, wherein the melt-processing is selected from the group consisting of injection molding, extrusion, extrusion-blow molding, transfer molding, blow molding, injection-expansion molding, thermoforming, sheet extrusion, co-extrusion, foam extrusion, foam molding, injection-stretch blow molding, and combinations thereof.

11. The method of claim 10, wherein the melt-processing results in at least one of films, foams, profiles, compounded pellets, fibers, woven fabrics, non-woven fabrics, yarns, molded parts, composites, and laminates.

12. The method of claim 11, wherein the woven or non-woven fabrics further comprise cellulosic fibers.

13. The method of claim 1, wherein the microwave-receptive additive further comprises at least one additional microwave-receptive additive selected from the group consisting of metals, metal salts, metal oxides, carbon, hydrated salts of metal compounds, polymeric receptive materials, silicates, ceramics, sulfides, titanates, carbides, sulfur, inorganic solid acids or salts, polymer acids or salts, inorganic or polymeric ion exchangers, inorganic or polymeric substances which contain a molecular or polymer microwave receptor, and organic conductors.

* * * * *